(12) United States Patent
Kyung et al.

(10) Patent No.: US 11,798,060 B2
(45) Date of Patent: *Oct. 24, 2023

(54) METHOD AND ELECTRONIC DEVICE FOR SHARING INFORMATION RELATED TO ITEM

(71) Applicant: Coupang Corp., Seoul (KR)

(72) Inventors: Su Jin Kyung, Seoul (KR); Eun Sol Lee, Seoul (KR); Seon Il Kim, Seoul (KR); Seung Yong Baek, Seoul (KR); In Ho Choi, Seoul (KR); Min Kyo Seo, Seoul (KR); Jin Young Choi, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/701,414

(22) Filed: Mar. 22, 2022

(65) Prior Publication Data

US 2022/0270156 A1 Aug. 25, 2022

Related U.S. Application Data

(63) Continuation of application No. 17/196,138, filed on Mar. 9, 2021, now Pat. No. 11,315,167.

(30) Foreign Application Priority Data

Feb. 19, 2021 (KR) .................... 10-2021-0022541

(51) Int. Cl.
  *G06Q 30/06* (2023.01)
  *G06Q 30/0601* (2023.01)
  (Continued)

(52) U.S. Cl.
  CPC ..... *G06Q 30/0631* (2013.01); *G06F 16/9566* (2019.01); *G06Q 30/0643* (2013.01); *G06Q 50/01* (2013.01)

(58) Field of Classification Search
  CPC .......... G06Q 30/0601; G06Q 30/0643; G06Q 50/01; G06F 16/9566
  (Continued)

(56) References Cited

U.S. PATENT DOCUMENTS

| | | | |
|---|---|---|---|
| 8,438,052 B1 | 5/2013 | Chanda et al. | |
| 2001/0056493 A1* | 12/2001 | Mineo | ................ G06Q 30/0239 709/227 |

(Continued)

FOREIGN PATENT DOCUMENTS

| | | |
|---|---|---|
| CN | 107392640 A | 11/2017 |
| CN | 109685549 A | 4/2019 |

(Continued)

OTHER PUBLICATIONS

Article, "Best lead generation tips and tricks in SEO"; CEO Magazine Athena Information Solutions Pvt. Ltd. (Aug. 28, 2020), retrieved from Dialog on May 1, 2023 (Year: 2020).*

(Continued)

*Primary Examiner* — Yogesh C Garg
(74) *Attorney, Agent, or Firm* — Knobbe, Martens, Olson & Bear, LLP

(57) ABSTRACT

According to various example embodiment of the present disclosure, a method of sharing item information by an electronic apparatus includes acquiring a request for link information related to at least one item from a user, acquiring first selection information related to an attribute of the link information, and providing link information on a first page including information related to the at least one item based on the request for the link information and the first selection information, in which the link information may include information related to the attribute.

13 Claims, 12 Drawing Sheets

(51) Int. Cl.
 *G06Q 50/00* (2012.01)
 *G06F 16/955* (2019.01)

(58) Field of Classification Search
 USPC ........................................................ 705/26.7
 See application file for complete search history.

(56) References Cited

U.S. PATENT DOCUMENTS

| | | |
|---|---|---|
| 2003/0014331 A1 | 1/2003 | Simons |
| 2003/0023687 A1 | 1/2003 | Wolfe |
| 2012/0046960 A1 | 2/2012 | Salta |
| 2012/0246191 A1 | 9/2012 | Xiong |
| 2013/0346172 A1 | 12/2013 | Wu |
| 2014/0067557 A1 | 3/2014 | van Niekerk et al. |
| 2014/0172623 A1* | 6/2014 | Graham ............. G06Q 30/0641 705/26.7 |
| 2016/0350780 A1 | 12/2016 | G et al. |
| 2020/0051114 A1 | 2/2020 | Wang et al. |
| 2020/0242648 A1 | 7/2020 | Glazier et al. |

FOREIGN PATENT DOCUMENTS

| | | | |
|---|---|---|---|
| KR | 10-2006-0086658 A | 8/2006 | |
| KR | 10-2011-0000890 A | 1/2011 | |
| KR | 10-2015-0028376 A | 3/2015 | |
| KR | 10-2017-0077479 A | 7/2017 | |
| KR | 10-2017-0140789 A | 12/2017 | |
| KR | 10-2018-0027246 A | 3/2018 | |
| KR | 10-2020-0027166 A | 3/2020 | |
| KR | 20200040594 A | 4/2020 | |
| WO | WO-2014036399 A2 * | 3/2014 | ......... G06Q 30/0207 |
| WO | WO 2017/190596 A1 | 11/2017 | |

OTHER PUBLICATIONS

Article, "Nokia Seeks Patent for Method and Apparatus for Sharing Point of Interest Information as a Weblink," published Nov. 27, 2014 in Global IP News Telecom Patent News extracted from Dialog database on Dec. 2, 2021.
Berman, Barry. "Referral marketing: Harnessing the power of your customers." Business Horizons 59.1 (2016): 19-28. (Year: 2016).
Naver Blog, https://blog.naver.com/63hwanlm/222214764254, accessed on Jan. 21, 2021.

* cited by examiner

FIG. 9 https://link.xxx.com/re/First attribute?First identification information=CFM123&Second identification information=624&Third identification information=213&Fourth identification information=350 https://link.xxx.com/re/second attribute?First identification information=CFM123&Second identification information=624&Third identification information=213&Fourth identification information=350

METHOD AND ELECTRONIC DEVICE FOR SHARING INFORMATION RELATED TO ITEM

CROSS-REFERENCE TO RELATED APPLICATIONS

This application is a continuation of U.S. patent application Ser. No. 17/196,138, filed on Mar. 9, 2021, which claims priority to Korean Application No. 10-2021-0022541, filed Feb. 19, 2021, each of which is incorporated herein by reference in its entirety.

BACKGROUND

Technical Field

The following descriptions relate to a method and electronic device for sharing information related to an item.

Description of the Related Art

Pages for specific items may be shared by various sharing methods. A user may create a link to items that he/she intends to share and share the created link with other users.

The sharing of such link information is often the form of a referral program, and when other users who access the link shared by the user purchase items on the link page, some kind of benefits may be provided to the user who has shared the link.

Korean Patent Laid-Open Publication No. 10-2006-0086658, which may be referenced as a related art document, discloses a feature of sharing product information between shopping malls, but does not disclose setting the information related to benefits or managing the information after the sharing. Accordingly, there is a need for a method and an apparatus for solving such a problem.

SUMMARY

Technical Goals

Regarding the sharing of link information related to an item, on a platform that needs to provide rewards when other users purchase items by sharing a referral link in a community or the like where commercial activities are prohibited, the accurate accumulation of the rewards through the link sharing may be inaccurate. To solve such issues, an aspect of the present disclosure provides a method and an apparatus for enabling a user to selectively create and share a link on which a benefit occurs or a link for simply sharing in the process of creating and sharing the link, and providing a difference in text composition between both links or providing information on or regarding the nature of the accessed link from a re-directing page that accesses both the links.

Technical Solutions

According to an aspect, there is provided a method of sharing item information by an electronic apparatus, including: acquiring a request for link information related to at least one item from a user; acquiring first selection information related to an attribute of the link information; and providing link information on or regarding a first page including information related to the at least one item based on the request for the link information and the first selection information, in which the link information may include information related to the attribute.

According to another aspect, there is provided an electronic apparatus for sharing item information including a processor, in which the processor acquires a request for link information related to at least one item, acquires an input regarding first selection information related to an attribute of the link information, and provides link information on a first page including the information related to the at least one item based on the request for the link information and the first selection information, and the link information includes the information related to the attribute.

According to still another aspect, there is provided a non-transitory computer-readable storage medium including a medium configured to store computer-readable instructions to execute a method of sharing item information, in which when the computer-readable instructions are executed by a processor, the processor performs acquiring a request for link information related to at least one item from a user, acquiring first selection information related to an attribute of the link information, providing link information on a first page including the information related to the at least one item based on the request for the link information and the first selection information, and the link information may include information related to the attribute.

Effects

According to various aspects of the present disclosure, a method of providing information related to an item may allow a user to select the attribute of a link or change the attribute of the link after sharing the link, thereby increasing the accuracy of reward accumulation by.

According to various aspects of the present disclosure, an electronic apparatus may selectively provide a link to a user sharing the link according to the nature of the community or the like that intends to share the link, and effectively provide other users who purchase items by accessing a link with the presence or absence of revenue information about the link.

BRIEF DESCRIPTION OF THE DRAWINGS

FIG. 9 is an exemplary diagram of link information in the method of sharing item information according to various example embodiments of the present disclosure.

DETAILED DESCRIPTION

Figure 1:
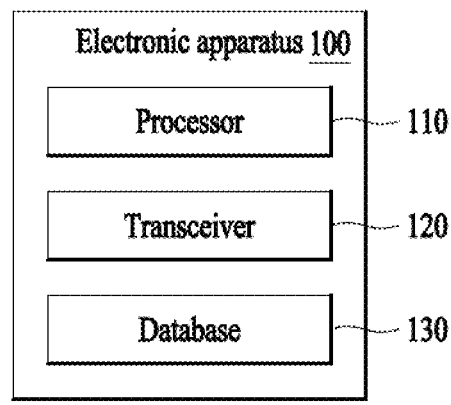
FIG. 1 is a block diagram illustrating components of an electronic apparatus according to various example embodiments of the present disclosure.

General terms that are currently widely used are selected as terms used in example embodiments in consideration of functions in the present disclosure, but may be changed depending on the intention of those skilled in the art or a judicial precedent, the emergence of a new technique, and the like. In addition, in specific cases, there may be terms arbitrarily chosen by the applicant. In this case, the meaning of such a term will be described in detail in a corresponding description portion. Therefore, the terms used in the present disclosure should be defined on the basis of the meanings of the terms and the content throughout the present disclosure rather than the simple names of the terms.

Throughout the specification, unless otherwise designated, "including" any component means that other components may be further included rather than excluding other components. In addition, the terms "unit," "module," and the like, described in the specification refer to a processing unit of at least one function or operation and may be implemented by hardware or software or a combination of hardware and software.

The expression "at least one of a, b, and c" described throughout the specification may include "a alone," "b alone," "c alone," "a and b," "a and c," "b and c," or "all of a, b, and c."

A "terminal" described below may be implemented as a computer or a portable terminal that may access a server or other terminals through a network. Here, computers may include, for example, a notebook computer, a desktop computer, a laptop computer, and the like, which are equipped with a web browser, and portable terminals are wireless communication devices that ensure portability and mobility, and may include, for example, all kinds of handheld-based wireless communication devices such as a communication-based terminal, a smartphone, and a tablet personal computer (PC) which support International Mobile Telecommunications (IMT), code division multiple access (CDMA), W-code division multiple access (W-CDMA), Long Term Evolution (LTE), etc.

Hereinafter, the example embodiments of the present disclosure will be described in detail with reference to the accompanying drawings so that those skilled in the art to which the present disclosure pertains may easily practice the present disclosure. However, the present disclosure may be implemented in various different forms and is not limited to the example embodiments described herein.

Hereinafter, the example embodiments of the present disclosure will be described in detail with reference to the accompanying drawings.

In describing the example embodiments, descriptions of technical contents that are well known in the technical field to which the present disclosure pertains and are not directly related to the present disclosure will be omitted. This is to more clearly convey the gist of the present disclosure without ambiguity by omitting unnecessary descriptions.

For the same reason, some components in the accompanying drawings are exaggerated, omitted, or schematically illustrated. In addition, the size of each component does not entirely reflect the actual size. The same reference numerals are assigned to the same or corresponding components in each drawing.

Various advantages and features of the present disclosure and methods accomplishing them will become apparent from the following description of example embodiments with reference to the accompanying drawings. However, the present disclosure is not limited to the example embodiments disclosed herein, but will be implemented in various forms. The example embodiments make contents of the present disclosure thorough and are provided so that those skilled in the art can easily understand the scope of the present disclosure. Therefore, the present disclosure will be defined by the scope of the appended claims. Throughout the specification, like reference numerals denote like components.

In this case, it will be appreciated that each block of a processing flowchart and combinations of the flowcharts may be executed by computer program instructions. Since these computer program instructions may be installed in a processor of a general computer, a special purpose computer, or other programmable data processing apparatuses, these computer program instructions running through the processing of the computer or the other programmable data processing apparatuses create a means for performing functions described in the block(s) of the flowchart. Since these computer program instructions may also be stored in a computer usable or computer readable memory of a computer or other programmable data processing apparatuses in order to implement the functions in a specific scheme, the computer program instructions stored in the computer usable or computer readable memory can also produce manufacturing articles including an instruction means for performing the functions described in the block(s) of the flowchart. Since the computer program instructions may also be installed in the computer or the other programmable data processing apparatuses, the instructions perform a series of operation steps on the computer or the other programmable data processing apparatuses to create processes executed by the computer, thereby running the computer or the other programmable data processing apparatuses may also provide operations for performing the functions described in the block(s) of the flowchart.

In addition, each block may indicate some modules, segments, or codes including one or more executable instructions for executing a specific logical function(s). Further, it is to be noted that functions mentioned in the blocks occur regardless of a sequence in some alternative example embodiments. For example, two blocks that are consecutively shown may in fact be simultaneously performed or performed in a reverse sequence depending on corresponding functions.

FIG. 1 is a block diagram illustrating components of an electronic apparatus according to various example embodiments of the present disclosure.

Referring to FIG. 1, internal components of an electronic apparatus 100 are not limited only to the illustrated components. The electronic apparatus 100 may include at least one of a processor 110, a transceiver 120, and a database 130.

The processor 110 may process a series of operations for performing a method of sharing item information according to various example embodiments of the present disclosure. The processor 110 may control other components of the electronic apparatus 100.

The processor 110 may acquire a request for link information related to at least one item from a user. The processor 110 may acquire first selection information related to an attribute of the link information. The processor 110 may provide link information for a first page including information related to at least one item based on the request for the link information and the first selection information. The link information may include information related to the attribute and may include one of first attribute information or second attribute information. In the general description of the present specification, the first attribute information may include selection information related to an attribute that a reward is provided, and selection information related to an attribute that a reward is not provided. In an example embodiment, the reward may include a benefit provided to a user who has shared a link to correspond to a purchase of other users introduced through the link.

The transceiver 120 may perform a function of transmitting information stored in the database 130 of the electronic apparatus 100 or information processed by the processor 110 to another device or a function of receiving information from another device to the electronic apparatus 100.

The database 130 has a data structure implemented in a predetermined storage space of the electronic apparatus 100, and thus, functions such as storing, searching, deleting, editing, or adding data may be freely performed. For example, the database 130 may include fields or elements for processing functions such as storing, searching, deleting, editing, or adding data. The database 130 may store data related to performing the method of providing information by the electronic apparatus 100. For example, the database 130 may store instructions or data for an execution operation of the processor 110.

Figure 2:
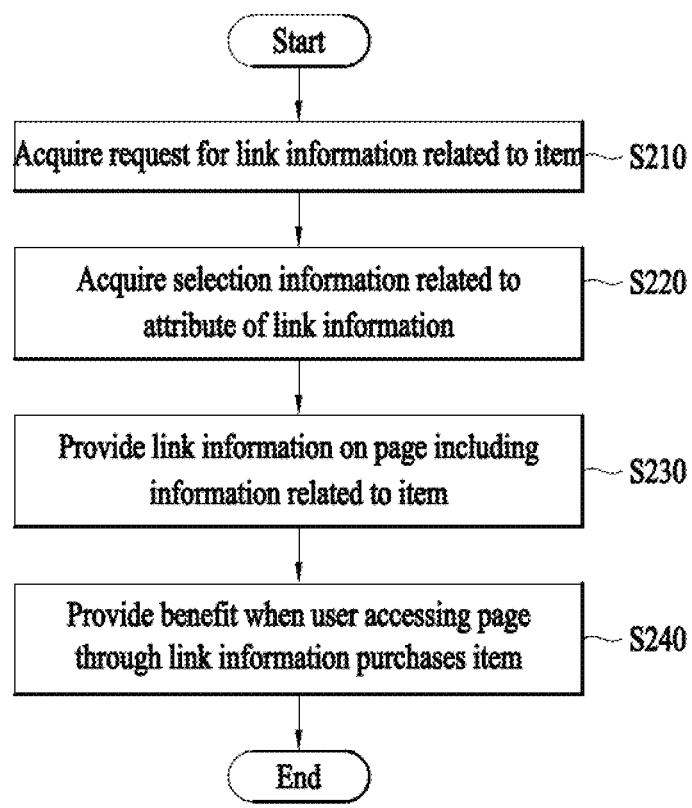
FIG. 2 is a schematic flowchart of a method of sharing item information according to various example embodiments of the present disclosure.

FIG. 2 is a schematic flowchart of a method of sharing item information according to various example embodiments of the present disclosure.

A method of sharing item information according to various example embodiments of the present disclosure may include a method in which a user shares a link to a page related to an item with other users. A page related to an item that a user intends to share may include a page that includes detailed information on or regarding the corresponding item, a bundle list page of an item that are related to the item that the user intends to share, a search result list page that includes a result of searching for the item that the user intends to share, and a recommend list page including other items to which additional benefits are provided during ordering along with the item that a user intends to share. The bundle list page may include a supplementary item, an accessory, or an extensible item of the item that a user intends to share. The recommended list page may include items to which a benefit of reducing a purchase amount is provided by reducing the delivery cost or by providing an additional discount to the total amount upon purchasing along with an item that a user intends to share.

According to various example embodiments of the present disclosure, even when on a page related to an item (for example, a first item) that a user intends to share and another user purchases an item (for example, a second item) other than the first item, a reward benefit may be provided to a user who shares the link information. For example, when a user shares a page related to an item by selecting the first attribute information, even when other users access the link and purchase items other than the first item on the page related to the item, the user may be provided with the reward benefit. According to an example embodiment, when other users access a link to purchase one item on a page related to an item, a reward corresponding to 1% of the purchase amount may be provided to the user. According to another example embodiment, when other users access a link to purchase n items on a page related to an item, a reward corresponding to 1% of the purchase amount may be provided to the user. A user may be adaptively provided with a reward according to the number of items purchased by other users on a page related to an item. Here, the number of items purchased by other users may be proportional to the purchase amount. A ratio of the reward to the purchase amount may be changed by setting or may be changed for each item. In order to provide a reward to a user who shares a link even when other users introduced through such a link purchase items other than the item corresponding to the link, the information identifying the page of the shared link may include reference information corresponding to the user of the shared link, and when the user moves to another page through the link within the page, the user corresponding to the reference information may be provided with a reward when the purchase occurs while maintaining at least some pieces of the reference information.

Referring to FIG. 2, in operation S210, a request for link information related to an item may be acquired. The link information related to the item may include information using, as a link, a uniform resource locator (URL) address of a page related to an item that a user intends to share. For example, a user may request to create link information related to an item that he/she intends to share. The request to create the link information may be acquired to correspond to an input of clicking a page sharing button displayed on a page related to an item that a user intends to share.

In operation S220, the selection information related to the attribute of the link information may be acquired. For example, the selection information related to the attribute of the link information may include first selection information and second selection information. The first selection information may include information related to the characteristic that a user is given a benefit of being provided a reward when other users access a link page through a link that the user intends to create and purchase items on the link page. For example, the first selection information may include selection information related to a first attribute that a reward is provided to a user. As another example, the first selection information may include selection information related to a second attribute that a reward is not provided to a user. In the general description of the present specification, the first attribute information may include the selection information related to the attribute that the reward is provided, and the second attribute information may include the selection information related to the attribute that the reward is not provided. Whether to provide the reward that is determined by the first attribute information and the second attribute information may be changed by the user's setting, and in this specification, it is described that the first attribute information corresponds to the information selected as the attribute that the reward is provided, and the second attribute information corresponds to the information selected as the attribute that the reward is not provided.

In operation S230, link information on a page (for example, a first page) including information related to an item that a user intends to share may be provided. For example, the user may be provided with the link information through an input to select the first selection information and the second selection information. The second selection information may be selected on the premise that the input to select the first selection information is acquired. For example, after the input to select the first selection information as the first attribute information is made, the input to select the second selection information may be made. The second selection information may include selection information related to a method of sharing link information that a user intends to share. For example, the second selection information may include information through which at least one of a sharing method through a messenger application, a sharing method through a social network service application, and a sharing method through a URL text copy of the link information is selected. The second selection information may not be changed to correspond to the input to select the first selection information by the user. For example, the types or number of pieces of the second selection information that can be selected may be the same according to the input to select the first selection information as the first attribute information and the input to select the second selection information as the second attribute information.

In operation S240, when other users who access a page through link information purchase items on the page, a benefit may be provided to a user who shares the link information. For example, the benefit provided to the user may include points or a cash reward of a site where the corresponding products are being sold. Here, a user to whom a benefit may be provided may include a user who has agreed to participate in a program in which a reward is provided by sharing link information. The program in which the reward is provided may include, for example, a reward program operating on a site on which products are being sold. The reward program may be a referral link sharing program, and the user may freely determine to participate in the reward program before and after sharing the link information. The participation in the reward program may be changed to participation or non-participation according to the user's input, and the user may change whether to participate in the reward program for each shared path even after sharing the link information. When the user changes whether to participate in the reward program after sharing the link information, the information on or regarding whether the link information is related to the reward program may be provided to other users who access a page through the link.

Figure 3:
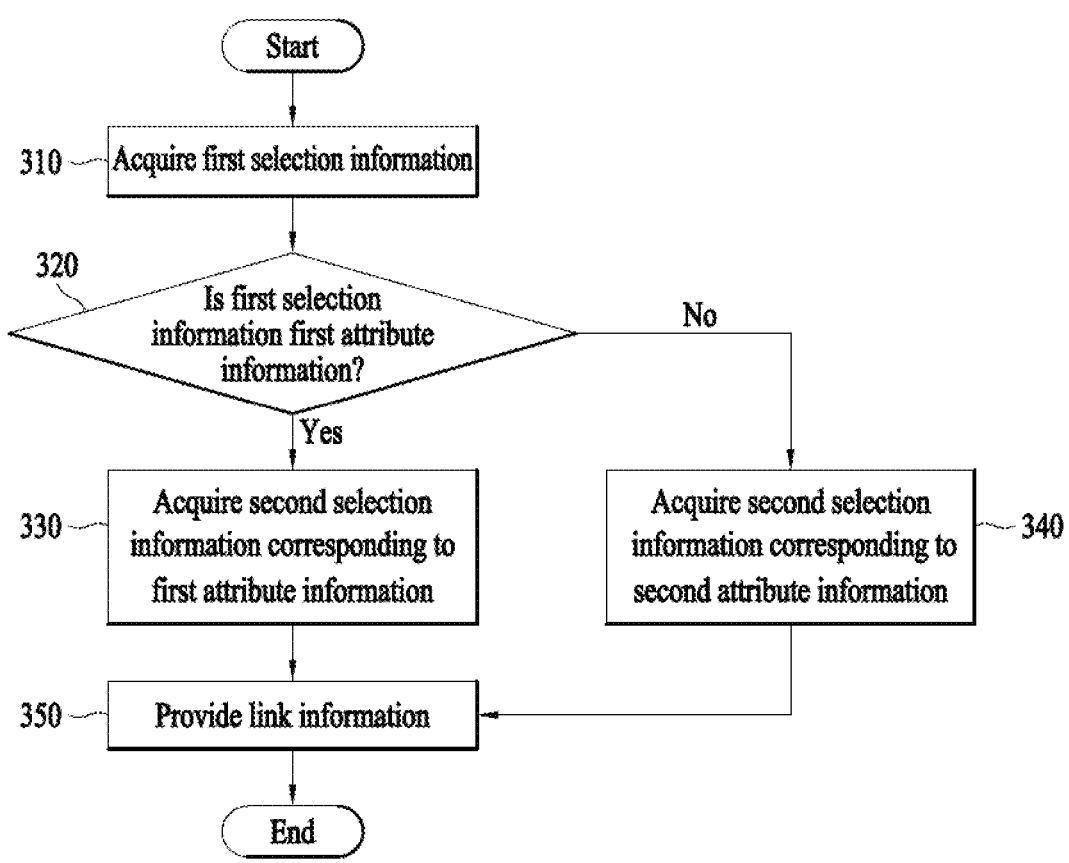
FIG. 3 is a flowchart illustrating the provision of link information in a method of sharing item information according to various example embodiments of the present disclosure.

FIG. 3 is a flowchart illustrating the provision of link information in a method of sharing item information according to various example embodiments of the present disclosure.

FIG. 3 may include a detailed flow of operations S220 and S230 of FIG. 2. Referring to FIG. 3, a process of selecting attribute information among selection information included in link information created by a user requesting the link information is illustrated.

In operation 310, an input regarding the first selection information among the selection information to be included in the link information requested by the user may be obtained. For example, the user may perform the input to select the first selection information as the first attribute information or the second attribute information.

In operation 320, it may be confirmed whether the acquired first selection information is the first attribute information. When the first selection information corresponds to the first attribute information in operation 320, the process may proceed to operation 330. When the first selection information does not correspond to the first attribute information in operation 320, the process may proceed to operation 340.

In operation 330, the second selection information corresponding to the first attribute information may be acquired. For example, the first attribute information may include the selection information related to the first attribute that the reward is provided. The second selection information may include the selection information related to the method of sharing link information that a user intends to share. For example, the second selection information may include information through which at least one of a sharing method through a messenger application, a sharing method through a social network service application, and a sharing method through a URL text copy of the link information is selected.

In operation 340, the second selection information corresponding to the first attribute information may be acquired. For example, the second attribute information may include the selection information related to the attribute that the reward is not provided. The second selection information may include the selection information related to the method of sharing link information that a user intends to share. For example, the second selection information may include information through which at least one of a sharing method through a messenger application, a sharing method through a social network service application, and a sharing method through a URL text copy of the link information is selected. The second selection information in operations 330 and 340 may include the information selected by providing the information sharing the same sharing method.

In operation 350, the link information generated through operations 330 and 340 may be provided. For example, the link information generated in operation 330 may include text or contents regarding the first attribute information or the second selection information. As another example, the link information generated in operation 340 may include text or contents regarding the second attribute information or the second selection information. The link information that may be provided in operation 350 may include different text or contents according to operations 330 and 340.

Figure 4A:
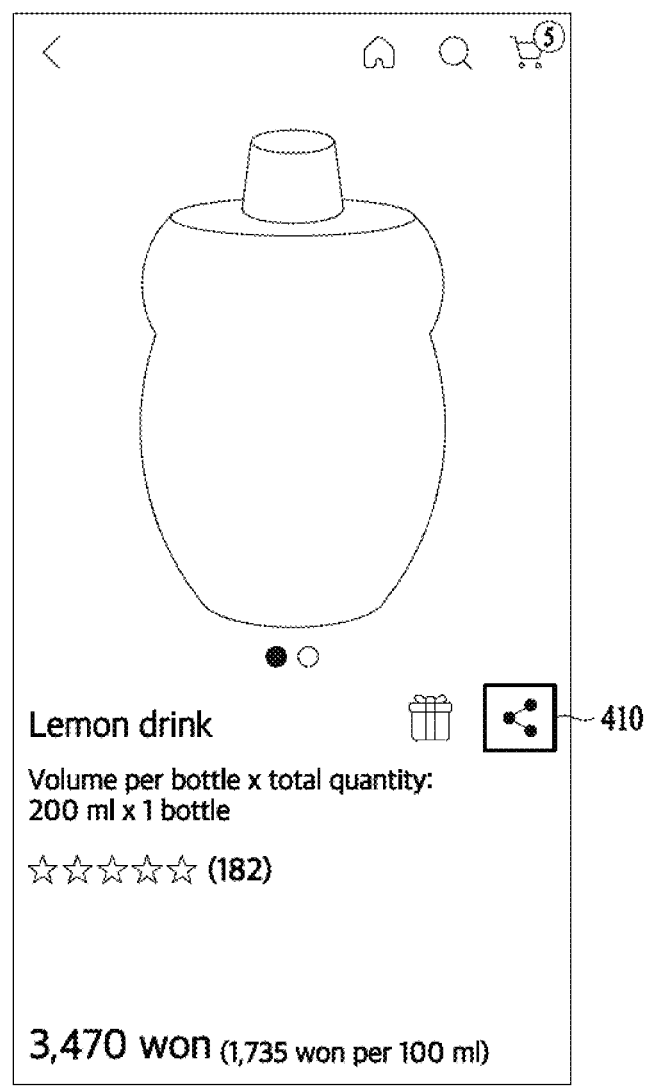
FIGS. 4A to 4C are exemplary diagrams of the acquisition of selection information for providing link information according to various example embodiments of the present disclosure.
Figure 4B:
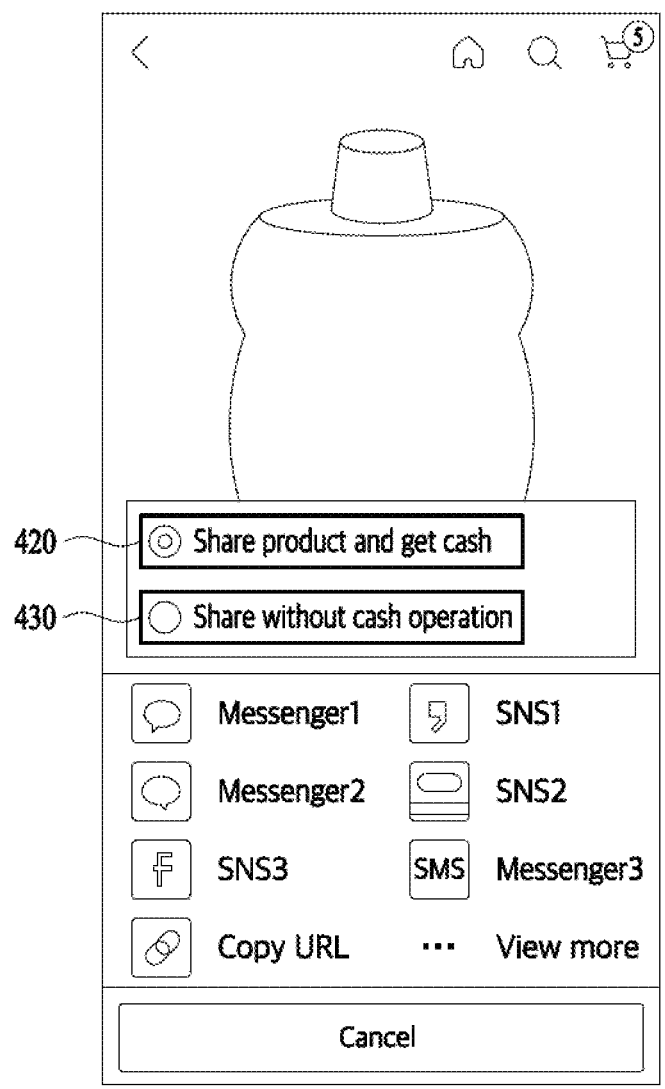
Figure 4C:
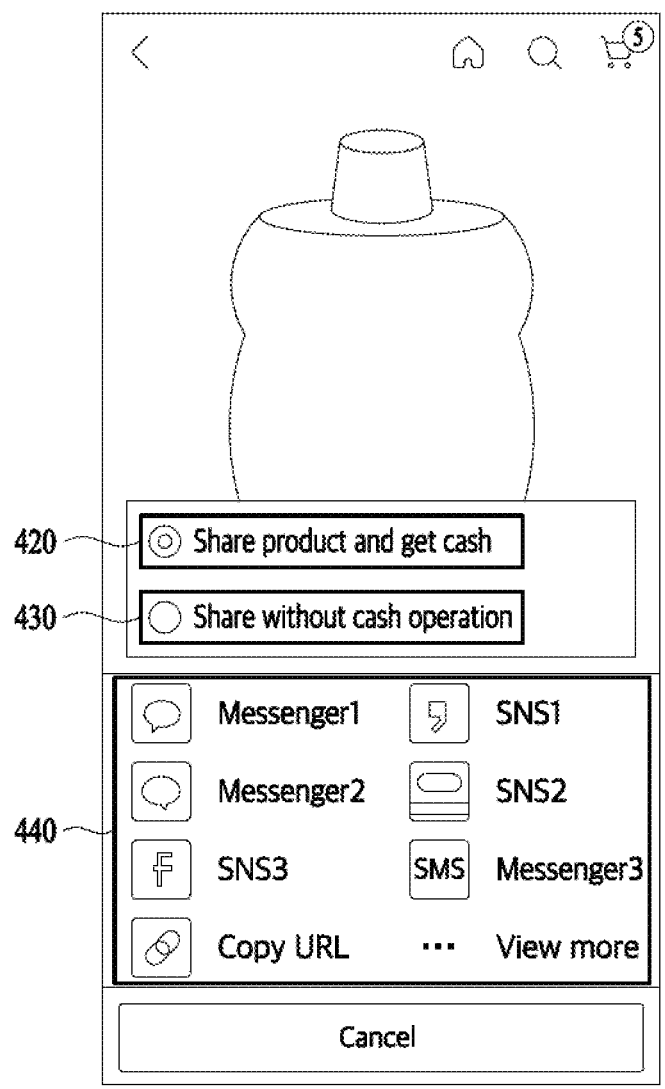

FIGS. 4A to 4C are exemplary diagrams of the acquisition of selection information for providing link information according to various example embodiments of the present disclosure.

FIG. 4A may correspond to an example of indicating a selection button for creating a link for sharing a corresponding page in a page (for example, a first page) including information related to an item.

According to various example embodiments, selection information on or regarding a selection button 410 for creating a link for sharing a page including information related to an item (for example, lemon beverage) may be acquired. The selection information by clicking or touching the selection button 410 may proceed to a process of confirming information for selecting an attribute of a link and a sharing method for creating a link to share a page including information related to an item.

FIG. 4B may correspond to an example of acquiring first selection information by selecting information related to an attribute of a link sharing a corresponding page from a page including information related to an item.

According to various example embodiments, the first selection information may include the information related to the characteristic that a user is given a benefit of being provided a reward when other users access a link page through a link that the user intends to create and purchase items on the link page. For example, the first selection information may include first attribute information 420 that a reward is provided to a user. As another example, the first selection information may include second attribute information 430 that a reward is not provided to a user.

When a user who has agreed to participate in the reward program shares link information on the first page, the first attribute information 420 may include information related to an attribute that a reward is provided to a user who shares the link information upon other users purchasing an item by accessing the first page through the shared link information. When a user who has agreed to participate in the reward program shares link information on the first page, the second attribute information 430 may include information related to an attribute that a reward is not provided to a user who shares the link information upon other users purchasing an item by accessing the first page through the shared link information.

FIG. 4C may correspond to an example of acquiring second selection information by selecting information related to a method of sharing a corresponding page from a page including information related to an item.

The second selection information 440 may include information through which at least one of a sharing method through a messenger application, a sharing method through a social network service application, and a sharing method through a URL text copy of the link information is selected.

Figure 5:
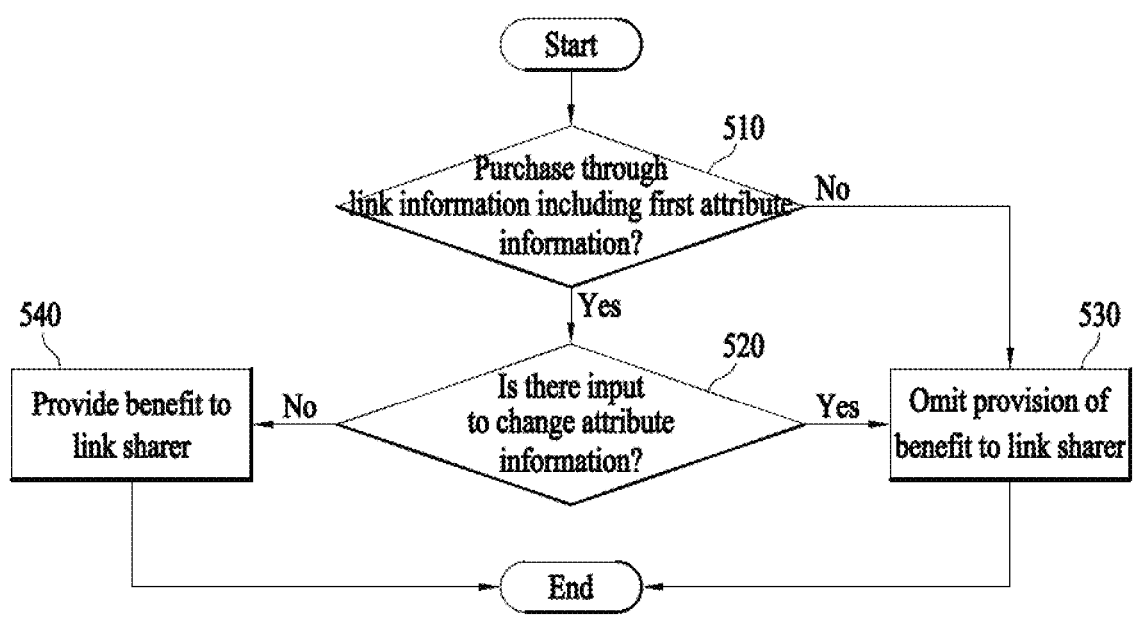
FIG. 5 is a flowchart related to a benefit upon purchasing an item through link information according to various example embodiments of the present disclosure.

FIG. 5 is a flowchart related to a benefit upon purchasing an item through link information according to various example embodiments of the present disclosure.

FIG. 5 illustrates a process of providing a reward benefit to a user sharing link information when other users who access a page related to an item through link information purchase items. When the reward benefit is provided to the user who has shared the link information, the shared link information may include the first attribute information or the second attribute information, but a separate input to change to the first attribute information may be made after sharing the link information.

In operation 510, it may be determined whether a purchase has been made through the link information including the first attribute information. It may be confirmed whether a purchase is made through link information including first attribute information by receiving information on a page accessed by other users who access the link. For example, when a user has shared the link information including the first attribute information, the URL of the access to a link page (for example, a first page) of other users who access through the shared link may be identified and confirmed. As another example, the information for each sharing method or for each URL in which the user shares link information may be confirmed on the page related to the reward program that manages the link information shared by the user. When a user shares the link information including the first attribute information on a page accessible by other users through the second selection information (for example, social network service (SNS) 1), information on a page accessed by other users may be confirmed by confirming information on an access page where the link information is shared through the second selection information. The determination of whether the purchase is made through the link information including the first attribute information in operation 510 may be confirmed without limitation of the method.

When it is determined in operation 510 that the item is purchased through the link information including the first attribute information, the process may proceed to operation 520. In operation 520, after other users who access the page through the link information including the first attribute information purchase items, a process of confirming whether the attribute information has been changed according to the input to change the attribute information by the intention that the user who has shared the link information does not receive the reward may be provided.

According to an example embodiment, even when the item is purchased by other users who access the link page by sharing the link information including the first attribute information with other users through the second selection information, it is possible to check whether the input to change the link information to the second attribute information is made by the input that does not receive the reward benefit through the link information. The input to change the attribute information of the link information already shared by the user may be performed on the page related to the reward program. For example, the user may perform an input to change the attribute information on or regarding the shared link information according to the second selection information or the information on the page that other users access by sharing the second selection information. To this end, the user may input the item information and shared attribute information on the shared links. In addition, in an example embodiment, the user may change only the attribute information on the links shared on a site including a specific character string among the shared links. For example, when a user inputs information of AAA.com, the attribute information only on the links shared on a site having a URL including the corresponding character string may be changed. Through this, the user may effectively manage the attribute of the shared link even when the links are shared with unwanted attribute information or when the policy of the shared site is changed. The user may input the participation or non-participation of the reward program in individual link information, which may correspond to the input to change the attribute information. However, after a purchase is made through the link information including the second attribute information, when the user who has shared the link information performs an input to change to the first attribute information, a link related to profitability may be displayed to other users who access a page through the changed link information. The process of displaying the link information related to the profitability may be included based on the attribute information included in the link information or the link information in which the attribute information is changed in the overall process of the present specification.

When it is determined in operation 510 that the item is purchased through the link information including the second attribute information and when it is determined that there is the input to change the attribute information in operation 520 through operation 510, the process proceeds to operation 530. In operation 530, when the item is purchased by other users that access the page through the link information including the second attribute information or after other users that access the page through the link information including the first attribute information purchase the items, the reward benefit may not be provided to the link sharer (for example, user) that has shared the link information when the attribute information of the link information is changed to the second attribute information.

In operation 540, the reward benefit may be provided to the link sharer who has shared the link information. For example, when other users who access the page through the link information including the first attribute information purchase items, the reward benefit may be provided to the link sharer who has shared the link information.

Figure 6A:
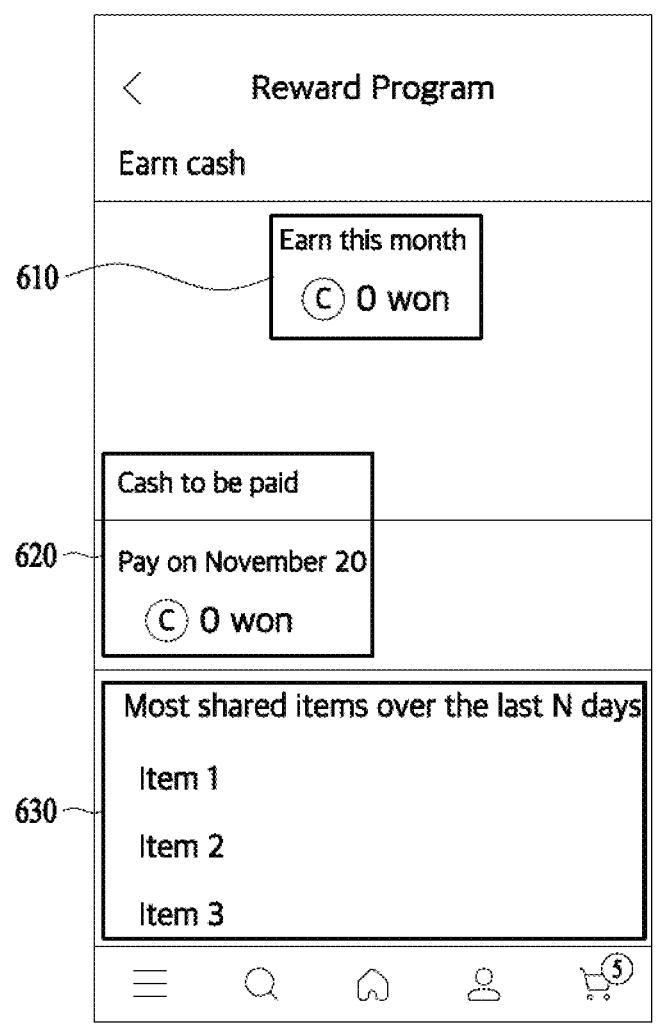
FIGS. 6A and 6B are exemplary diagrams illustrating information related to a benefit upon purchasing an item through link information according to various example embodiments of the present disclosure.
Figure 6B:
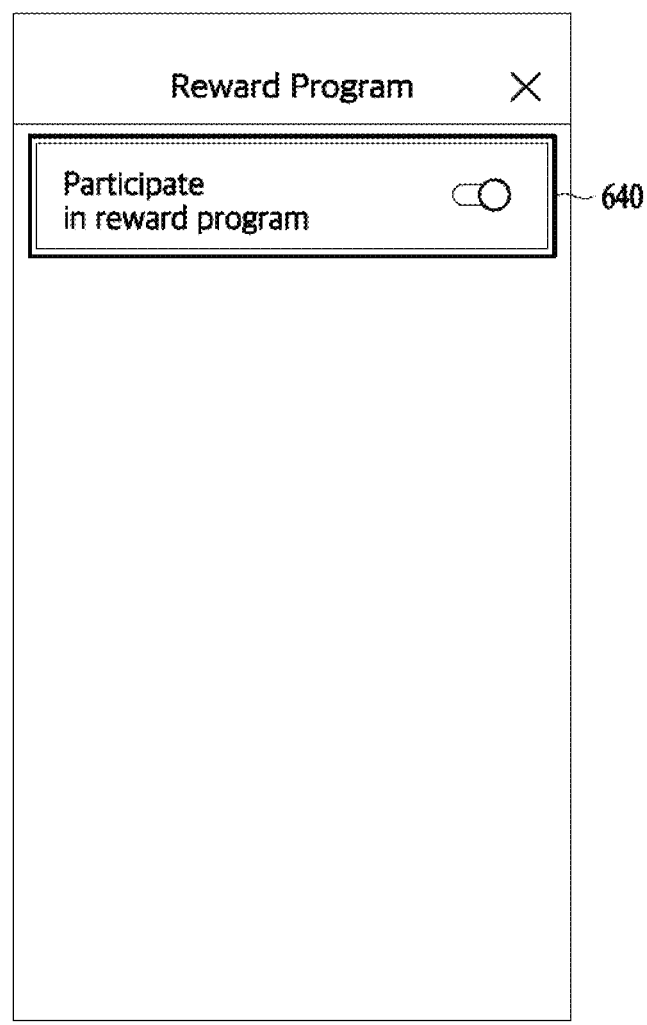

FIGS. 6A and 6B are exemplary diagrams illustrating information related to a benefit upon purchasing an item through link information according to various example embodiments of the present disclosure.

FIG. 6A may be an example of a page that may be included in a page related to a reward program. FIG. 6A may include a page through which a user who shares link information may confirm a received reward.

According to various example embodiments, a page on which a reward may be confirmed may include information on a reward provided to a user sharing the link information. The information on the reward may include information 610 of a reward benefit provided this month, information 620 of the reward benefit scheduled to be paid, and information 630 related to an item with high sharing frequency.

The information 610 of the reward benefit provided this month may include the information on the reward provided as the link information is shared and other users accessed through the link purchase items. For example, the information 610 of the reward benefit provided this month may include the information on the reward provided for the period before that, excluding the information 620 on the reward benefit scheduled to be paid.

The information 620 of the reward benefit scheduled to be paid may include the information on the reward provided as the link information is shared and other users accessed through the link purchase items. For example, the information 620 of the reward benefit scheduled to be paid may include the information on the reward provided after that, excluding the information 610 of the reward benefit provided this month.

The information 630 related to the item with high sharing frequency may include information on the item that has been most shared over the last n days. For example, information on item 1, item 2, and item 3 in the order of the highest sharing frequency may be included in the information 630 related to an item with highest sharing frequency.

FIG. 6B may be an example of information on or regarding whether to participate in a reward program that may be included on a page related to a reward program. The input of whether to participate in the reward program may be an input of participation or non-participation by, for example, a toggle input. In the example of FIG. 6B, it is displayed that the input of the participation or non-participation of the entire reward program is made, but in FIG. 8, an example in which various inputs of participation or non-participation are made may be described.

According to various example embodiments, the reward program may be a kind of referral link sharing program, and the user may freely determine to participate in the reward program before and after sharing the link information. Participation information 640 for a reward program may be changed to the participation information or non-participation information in the form of the toggle input. For example, the user may change the participation information 640 for the reward program to be displayed as the non-participation information by pressing the toggle button while the participation information 640 is displayed as the participation information. As another example, the user may change the participation information 640 for the reward program to be displayed as the participation information by pressing the toggle button while the participation information 640 is displayed as the non-participation information. The participation in the reward program may be changed to participation or non-participation according to the user's input, and the user may change whether to participate in the reward program for each shared path even after sharing the link information. When the user changes whether to participate in the reward program after sharing the link information, the information on whether the link information is related to the reward program may be provided to other users who access a page through the link.

Figure 7:
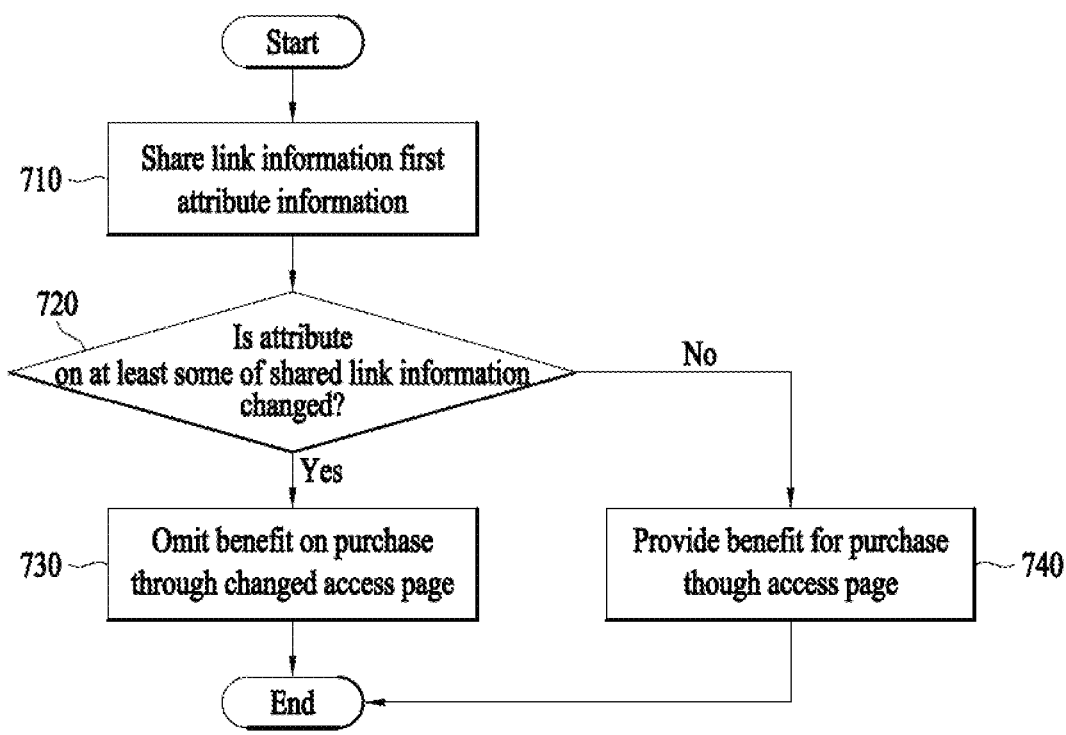
FIG. 7 is a flowchart related to providing a benefit according to whether an attribute of link information is changed according to various example embodiments of the present disclosure.

FIG. 7 is a flowchart related to providing a benefit according to whether an attribute of link information is changed according to various example embodiments of the present disclosure.

FIG. 7 may be similar to the flowchart of FIG. 5. FIG. 7 may illustrate a flow of a process of determining whether to provide a reward by checking whether a path for sharing attribute information of link information has been changed after a user shares link information.

In operation 710, a process of sharing link information so that a user who is provided with link information including first attribute information may access other users may be included. The link information shared by the user may include the second attribute information, but the link information shared in the present specification will be described on the basis of including the first attribute information.

In operation 720, a process of confirming whether the user who shares the link information including the first attribute information has performed an input to change the attribute information on at least a part of the shared link information to the second attribute information after sharing the link information may be included. For example, a user who is provided with link information on a first page or a second page that includes information on at least one item may share the link information with at least one site (for example, site 1 shared through SNS 1) through the SNS applications (for example, SNS 1, SNS 2, SNS 3, and the like). The user may change the attribute information on the shared link information after sharing the link information. When the sites shared through SNS 1 as the first attribute information are site 1, site 2, and site 3, the user may perform the input to change the first attribute information on site 1 to the second attribute information. In operation 720, the input to change the attribute of at least a part of the link information by the user may include the input to collectively change the attribute information on the shared link information on the site that has shared the link information.

Operations 730 and 740 may be performed in response to the confirmation in operation 720. In operation 730, when the input to change the attribute information on at least a part of the shared link information to the second attribute information is confirmed by a user who has shared the link information including the first attribute information after sharing the link information, it is possible to omit the provision of the reward benefit corresponding to the purchase to a user who shares the link when other users accesses the changed access page and purchase items. In operation 740, when the input to change the attribute information on at least a part of the shared link information to the second attribute information is not confirmed by a user who has shared the link information including the first attribute information after sharing the link information, it is possible to provide the reward benefit corresponding to the purchase to a user who shares the link when other users access an access page through the shared link and purchases items.

Figure 8:
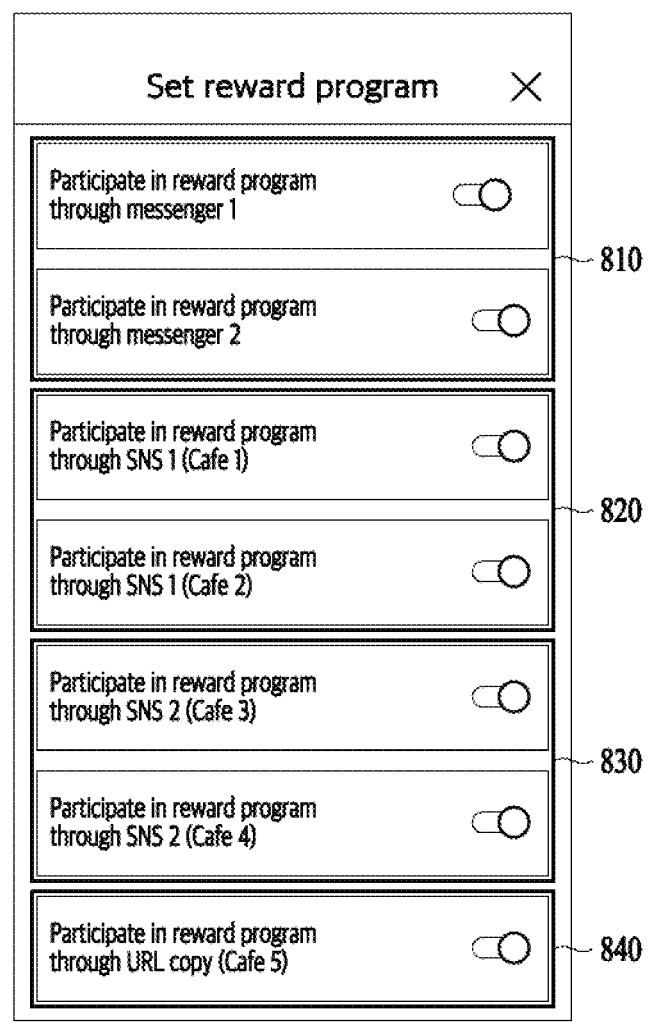
FIG. 8 is an exemplary diagram in which information related to a benefit according to various example embodiments of the present disclosure is displayed.

FIG. 8 is an exemplary diagram in which information related to a benefit according to various example embodiments of the present disclosure is displayed.

FIG. 8 may be an example of a page for setting participation information for a reward program (for example, participation information 640 for a reward program in FIG. 6) according to individual sites. The user may share the link information through the second selection information by a method of sharing messenger 1 based on the first selection information including the first attribute information. The user may share the link information through the second selection information by a method of sharing messenger 2 based on the first selection information including the first attribute information. The user may share link information to site 1 (for example: site of Cafe 1) and site 2 (for example: site of Cafe 2) through the second selection information by a method of sharing SNS 1 based on first selection information including first attribute information. The user may share link information to site 3 (for example: site of Cafe 3) and site 4 (for example: site of Cafe 4) through the second selection information by a method of sharing SNS 2 based on first selection information including first attribute information. The user may share the link information to site 5 (for example, site of Cafe 5) through the second selection information by a method of sharing a URL copy of link information based on the first selection information including the first attribute information. The settings shown in FIG. 8 are only examples, and examples of sites for Cafes 1 to 5 may correspond to individual bulletin boards of individual cafes. The cafe illustrated in FIG. 8 includes a site such as a blog and may include a sharing site of an SNS in a format in which link information may be shared.

According to various example embodiments, participation information for a reward program may be set for each site sharing link information. The user may set whether to participate in the reward program for each site sharing the link information according to the second selection information. For example, the user may set an input 810 of whether to participate in a reward program for link information shared through a messenger application. After sharing the link information including the first attribute information through messenger 1, the user may change the attribute information of the link information by setting an input of non-participation in the reward program. Here, even when the user changes the attribute information of the link information from the first attribute information to the second attribute information or from the second attribute information to the first attribute information through messenger 1, the text composition of the link information that is initially created may not be changed. The change in the attribute information included in the link information may include a change in whether to participate in the reward program. When the attribute information of the link information is changed from the first attribute information to the second attribute information or from the second attribute information to the first attribute information, the information on whether the link information is related to the reward program may be provided to other users who access the link page through the shared link. For example, the information for confirming that the link information is created by participating in the reward program may be provided to other users who access through the shared link. As another example, the information for confirming that the link information is created without participating in the reward program may be provided to other users who access the link page through the shared link.

The user may set an input 810 of whether to participate in a reward program for link information shared through a messenger application. After sharing the link information including the first attribute information through messenger 2, the user may change the attribute information on the link information by setting an input of non-participation in the reward program. Here, even when the user changes the attribute information on the link information from the first attribute information to the second attribute information or from the second attribute information to the first attribute information through messenger 2, the text composition of the link information that is initially created may not be changed. The change in the attribute information included in the link information may include a change in whether to participate in the reward program. When the attribute information of the link information is changed from the first attribute information to the second attribute information or from the second attribute information to the first attribute information, the information on whether the link information is related to the reward program may be provided to other users who access a link page through the shared link. For example, the information for confirming that the link information is created by participating in the reward program may be provided to other users who access through the shared link. As another example, the information for confirming that the link information is created without participating in the reward program may be provided to other users who access the link page through the shared link.

The user may set inputs 820 and 830 of whether to participate in a reward program for link information shared through an SNS application. After sharing the link information including the first attribute information through SNS 1, the user may change the attribute information on or regarding the link information by setting an input of non-participation in the reward program. For example, after sharing the link information to Cafe 1 or Cafe 2 through SNS 1 including the first attribute information, the user may change the attribute information of the link information to the second attribute information by setting the input 820 of whether to participate in the reward program as the non-participation. Here, even when the user changes the attribute information on the link information from the first attribute information to the second attribute information or from the second attribute information to the first attribute information through SNS 1, the text composition of the link information that is initially created may not be changed. The change in the attribute information included in the link information may include a change in whether to participate in the reward program. When the attribute information of the link information is changed from the first attribute information to the second attribute information or from the second attribute information to the first attribute information, the information on whether the link information is related to the reward program may be provided to other users who access a link page through the shared link. For example, the information for confirming that the link information is created by participating in the reward program may be provided to other users who access through the shared link. As another example, the information for confirming that the link information is created without participating in the reward program may be provided to other users who access the link page through the shared link.

The user may set the inputs 820 and 830 of whether to participate in a reward program for link information shared through an SNS application. After sharing the link information including the first attribute information through SNS 2, the user may change the attribute information on the link information by setting an input of non-participation in the reward program. For example, after sharing the link information to the Cafe 3 or Cafe 4 through SNS 2 including the first attribute information, the user may change the attribute information of the link information to the second attribute information by setting the input 830 of whether to participate in the reward program as the non-participation. Here, even when the user changes the attribute information on the link information from the first attribute information to the second attribute information or from the second attribute information to the first attribute information through SNS 2, the text composition of the link information that is initially created may not be changed. The change in the attribute information included in the link information may include a change in whether to participate in the reward program. When the attribute information of the link information is changed from the first attribute information to the second attribute information or from the second attribute information to the first attribute information, the information on whether the link information is related to the reward program may be provided to other users who access a link page through the shared link. For example, the information for confirming that the link information is created by participating in the reward program may be provided to other users who access through the shared link. As another example, the information for confirming that the link information is created without participating in the reward program may be provided to other users who access the link page through the shared link.

The user may set an input 840 of whether to participate in a reward program for link information shared through a URL copy. After sharing the link information including the first attribute information through the URL copy, the user may change the attribute information on the link information by setting an input of non-participation in the reward program. For example, after sharing the link information to the Cafe 5 through the URL copy including the first attribute information, the user may change the attribute information of the link information to the second attribute information by setting the input 840 of whether to participate in the reward program as the non-participation. Here, even when the user changes the attribute information on the link information from the first attribute information to the second attribute information or from the second attribute information to the first attribute information through the URL copy, the text composition of the link information that is initially created may not be changed. The change in the attribute information included in the link information may include a change in whether to participate in the reward program. When the attribute information of the link information is changed from the first attribute information to the second attribute information or from the second attribute information to the first attribute information, the information on whether the link information is related to the reward program may be provided to other users who access a link page through the shared link. For example, the information for confirming that the link information is created by participating in the reward program may be provided to other users who access through the shared link. As another example, the information for confirming that the link information is created without participating in the reward program may be provided to other users who access the link page through the shared link.

FIG. 9 is an exemplary diagram of link information in the method of sharing item information according to various example embodiments of the present disclosure.

FIG. 9 may be an example illustrating link information on a page including information related to an item according to attribute information. According to various example embodiments, the link information may be composed of different texts according to attribute information. FIG. 9 may be an example illustrating link information including first attribute information and link information including second attribute information.

According to various example embodiments, the link information may be configured to include text 910 for displaying attribute information, text 920 for displaying first identification information, text 930 for displaying second identification information, text 940 for displaying third identification information, and text 950 for displaying fourth identification information. The text 910 for displaying the attribute information included in the link information may not be the same when the attribute information is different, but the texts 920 to 950 for displaying the first to fourth identification information may be the same. Meanwhile, in an example embodiment, texts may include numbers and symbols.

The text 920 displaying the first identification information may include the identification information on or regarding the reward program of the user who shares the link information. For example, the text 920 displaying the first identification information may be set differently for each individual user participating in the reward program. The first user may set the text 920 displaying the first identification information to CFM123, and the second user may set the text 920 displaying the first identification information to CFM903.

The text 930 displaying the second identification information may include identification information on the page accessed through the link information. For example, the text 930 displaying the second identification information may be set differently for each page related to an item. For example, when a user receives and shares link information on a first page related to a first item, the text 930 displaying the second identification information may be set to 624. As another example, when a user receives and shares link information on a second page related to a first item, the text 930 displaying the second identification information may be set to 672.

The text 940 displaying the third identification information may include identification information on the item on the page accessed through the link information. For example, when the text 940 displaying the third identification information receives and shares link information on an $n^{th}$ page related to the first item, the text 940 displaying the third identification information may be set to 213. As another example, when a user receives and shares link information on a second page related to a second item, the text 940 displaying the third identification information may be set to 738. As another example, when a user receives and shares link information on a second page related to a first item, the text 940 displaying the third identification information may be set to 213. When the second page includes a list page including the first item, and the first item is an item first listed on the list page, the text 940 displaying the third identification information is represented and set as identification information on the first item.

The text 950 displaying the fourth identification information may include identification information on a seller of an item accessed through the link information. For example, the text 950 displaying the fourth identification information may be set to 350 corresponding to identification information on a first seller who sells the first item. As another example, the text 950 displaying the fourth identification information may be set to 489 corresponding to identification information on a second seller who sells the first item.

According to various example embodiments of the present disclosure, a method of sharing item information by an electronic apparatus may include acquiring a request for link information related to at least one item from a user, acquiring first selection information related to an attribute of the link information, and providing link information on a first page including the information related to the at least one item based on the request for the link information and the first selection information, in which the link information may include the information related to the attribute.

According to various example embodiments of the present disclosure, the method of sharing item information by an electronic apparatus may include acquiring second selection information related to a method of sharing the link information, in which the providing of the link information may include providing the link information through a method determined based on the second selection information.

In the method of sharing item information by an electronic apparatus according to various example embodiments of the present disclosure, the information related to the attribute may include first attribute information that provides a benefit to the user when another user who has accessed the first page through the link information purchases the at least one item, and second attribute information that does not provide the benefit to the user irrespective of whether another user who has accessed the first page through the link information purchases the at least one item.

In the method of sharing item information by an electronic apparatus according to various example embodiments of the present disclosure, the link information may include identification information on a user requesting the link information, identification information on a page related to the at least one item, identification information on the at least one item, and identification information on a seller related to the at least one item In the method of sharing item information by an electronic apparatus according to various example embodiments of the present disclosure, the second selection information may include information through which at least one of a sharing method through a messenger application, a sharing method through an SNS application, and a sharing method through a URL text copy of the link information is selected.

In the method of sharing item information by an electronic apparatus according to various example embodiments of the present disclosure, the providing of the link information may further include providing link information on a second page, and the second page may include a list page of the at least one item.

In the method of sharing item information by an electronic apparatus according to various example embodiments of the present disclosure, the list page may include a search result list page for the at least one item, a bundle list page of items related to the at least one item, and a recommended list page of items to which an additional benefit is provided upon purchase along with the at least one item, the bundle list page may be created to correspond to a selection input of the user regarding the related item, and the recommended list page may be created to correspond to an item that provides a benefit of reducing a purchase amount upon purchase along with the at least one item.

In the method of sharing item information by an electronic apparatus according to various example embodiments of the present disclosure, when another user who accesses the second page through the first attribute information purchases the at least one item included in the second page, a benefit may be adaptively provided to the user according to the number of purchased items.

According to various example embodiments of the present disclosure, the method of sharing item information by an electronic apparatus may further include an input to change the information related to the attribute, changing information related to the attribute of the link information to correspond to the input to change the information, and providing changed information related to the attribute to another user who accesses the first page or the second page through the link information in which the information related to the attribute is changed.

According to various example embodiments of the present disclosure, the method of sharing item information by an electronic apparatus may further providing the information related to the benefit, in which the information related to the benefit may be changed when another user purchases the at least one item through the link information including the first attribute information.

In the method of sharing item information by an electronic apparatus according to various example embodiments of the present disclosure, the providing of the changed information related to the attribute may include providing the changed information related to the attribute to the other user through a user interface (UI) including information on whether a benefit is provided to the user by the access through the link information.

According to various example embodiments of the present disclosure, the method of sharing item information by an electronic apparatus may further include confirming an access page of another user accessing the first page or the second page through the link information, in which the benefit is provided to the user to correspond to the information related to the attribute of the link information shared by the access page.

According to various example embodiment of the present disclosure, an electronic apparatus for sharing item information may include a processor, in which the processor acquires a request for link information related to at least one item, acquires an input regarding first selection information related to an attribute of the link information, and provides link information related to a first page including the information related to the at least one item based on the request for the link information and the first selection information, and the link information includes the information related to the attribute.

According to various example embodiment of the present disclosure, a non-transitory computer-readable storage medium may include a medium configured to store computer-readable instructions to execute a method of sharing item information, in which when the computer-readable instructions are executed by a processor, the processor may include acquiring a request for link information related to at least one item from a user, acquiring first selection information related to an attribute of the link information, and providing link information on a first page including the information related to the at least one item based on the request for the link information and the first selection information, in which the link information may include information related to the attribute.

Meanwhile, the example embodiment of the present disclosure has been disclosed in the present specification and drawings, and although specific terms are used, this is merely used in a general sense to easily describe the technical content of the present disclosure and to aid understanding of the present disclosure, but is not intended to limit the scope of the present disclosure. It is obvious to those of ordinary skill in the art to which the present disclosure pertains that other modifications based on the technical idea of the present disclosure can be implemented in addition to the example embodiments disclosed herein.

The electronic apparatus or terminal according to the above-described example embodiments may include a processor, a memory that stores and executes program data, a permanent storage such as a disk drive, a communication port for communication with an external device, a touch panel, a key, a user interface device such as a button, and the like. Methods implemented as software modules or algorithms may be stored on a computer-readable recording medium as computer-readable code or program instructions executable on the processor. Here, examples of the computer-readable recording medium may include magnetic storage media (for example, a read-only memory (ROM), a random-access memory (RAM), a floppy disk, a hard disk, etc.), optical reading media (for example, a compact disk (CD)-ROM or a digital versatile disc (DVD)), and the like. The computer-readable recording medium may be distributed in computer systems connected to each other through a network, and as a result, the computer-readable code may be stored and executed in a distributed scheme. The medium may be readable by a computer, stored in a memory, and executed on a processor.

The present example embodiment may be represented by functional block configurations and various processing operations. These functional blocks may be implemented by various numbers of hardware and/or software components that execute specific functions. For example, the example embodiment may employ integrated circuit configurations, such as a memory, processing, logic, and a look-up table, capable of executing various functions by control of one or more microprocessors or other control devices. Similar to executing the components in software programming or software elements, the present example embodiment can be implemented by programming or scripting languages such as python, C, C++, Java, and assembler, including various algorithms implemented by a combination of data structures, processes, routines or other programming configurations. Functional aspects may be implemented in algorithms executed on one or more processors. In addition, the present example embodiment may employ conventional techniques for electronic environment setting, signal processing, and/or data processing, and the like. Terms such as "mechanism," "element," "means," and "configuration" may be used broadly and are not limited to mechanical and physical configurations. The terms may include the meaning of a series of routines of software in connection with a processor or the like.

The above-described example embodiments are merely examples, and other example embodiments may be implemented within the scope of the following claims.

What is claimed is:

1. A method of sharing item information by an electronic apparatus, the method executed by the electronic apparatus and comprising:
   acquiring a request for link information related to at least one item from a first user device associated with a first user;
   acquiring first selection information related to an attribute of the link information from the first user device, the attribute of the link information including first attribute or second attribute;
   providing the link information regarding a first page including first information related to the at least one item based on the request for the link information and the first selection information;
   receiving an input to change the attribute of the link information;
   changing the attribute of the link information based on the input to change the attribute of the link information; and
   providing, to a second user who accesses the first page or a second page through the link information of which the attribute is changed, second information regarding whether the link information of the changed attribute is related to profitability subject to purchase of the item shared,
   wherein the link information includes third information related to the attribute of the link information, and
   wherein the input to change the attribute of the link information includes an input for changing the attribute of the link information without changing a text configuration of the link information subject to purchase of the item shared.

2. The method of claim 1, further comprising:
   acquiring second selection information related to a sharing method of the link information,
   wherein the providing of the link information comprises providing the link information through a method determined based on the second selection information.

3. The method of claim 2, wherein:
   the first attribute provides a benefit to the first user in response to determining that second user who accesses the first page through the link information purchases the at least one item; and
   the second attribute does not provide the benefit to the first user irrespective of whether the second user purchases the at least one item.

4. The method of claim 3, wherein the providing of the link information further comprises providing link information on the second page, and wherein the second page includes a list page of the at least one item.

5. The method of claim 4, wherein:
   the list page includes a search result list page for the at least one item, a bundle list page of items related to the at least one item, and a recommended list page of items to which an additional benefit is provided upon purchase along with the at least one item;
   the bundle list page is created to correspond to a selection input of the first user regarding the items related to the at least one item; and
   the recommended list page is created to correspond to an item that provides a benefit of reducing a purchase amount upon purchase along with the at least one item.

6. The method of claim 4, wherein in response to determining that the second user who accesses the second page through the link information of the first attribute purchases the at least one item included in the second page, adaptively providing a benefit to the first user according to a number of purchased items.

7. The method of claim 3, further comprising:
   providing fourth information related to the benefit,
   wherein the fourth information related to the benefit is changed in response to determining that the second user purchases the at least one item through the link information including information related to the first attribute.

8. The method of claim 2, wherein the second selection information includes information through which at least one of a sharing method through a messenger application, a sharing method through a social network service application, or a sharing method through a uniform resource locator (URL) text copy of the link information is selected.

9. The method of claim 1, wherein the link information includes identification information regarding a user requesting the link information, identification information regarding a page related to the at least one item, identification information regarding the at least one item, and identification information regarding a seller related to the at least one item.

10. The method of claim 1, wherein the providing of the second information comprises providing the third information related to the attribute to the second user through a user interface (UI) including information regarding whether benefit is provided to the first user by the access through the link information.

11. The method of claim 1, further comprising:
identifying an access page of the second user accessing the first page or the second page through the link information,
wherein benefit is provided to the first user based on the third information related to the attribute of the link information shared by the access page.

12. An electronic apparatus for sharing item information, the electronic apparatus comprising:
a processor,
wherein the processor is configured to:
acquire a request for link information related to at least one item;
acquire first selection information related to an attribute of the link information, the attribute of the link information including first attribute or second attribute;
provide the link information related to a first page including the first information related to the at least one item based on the request for the link information and the first selection information;
receive an input to change the attribute of the link information;
change the attribute of the link information based on the input to change the attribute of the link information; and
provide to a second user who accesses the first page or a second page through the link information of which the attribute is changed, second information regarding whether the link information of the changed attribute is related to profitability subject to purchase of the item shared,
wherein the link information includes third information related to the attribute of the link information, and
wherein the input to change the attribute of the link information includes an input for changing the attribute of the link information without changing a text configuration of the link information subject to purchase of the item shared.

13. A non-transitory computer-readable storage medium comprising:
a medium configured to store computer-readable instructions,
wherein the computer-readable instructions are executed by a processor to perform a method of sharing item information, the method comprising:
acquiring a request for link information related to at least one item from a first user device associated with a first user;
acquiring first selection information related to an attribute of the link information from the first user device, the attribute of the link information including first attribute or second attribute;
providing the link information regarding a first page including first information related to the at least one item based on the request for the link information and the first selection information;
receiving an input to change the attribute of the link information;
changing the attribute of the link information based on the input to change the attribute of the link information; and
providing, to a second user who accesses the first page or a second page through the link information of which the attribute is changed, second information regarding whether the link information of the changed attribute is related to profitability subject to purchase of the item shared,
wherein the link information includes third information related to the attribute of the link information, and
wherein the input to change the attribute of the link information includes an input for changing the attribute of the link information without changing a text configuration of the link information subject to purchase of the item shared.

* * * * *